US010867039B2

(12) United States Patent
Gordeychik et al.

(10) Patent No.: US 10,867,039 B2
(45) Date of Patent: Dec. 15, 2020

(54) SYSTEM AND METHOD OF DETECTING A MALICIOUS FILE

(71) Applicant: AO Kaspersky Lab, Moscow (RU)

(72) Inventors: Sergey V. Gordeychik, Moscow (RU); Sergey V. Soldatov, Moscow (RU); Konstantin V. Sapronov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 240 days.

(21) Appl. No.: 16/011,822

(22) Filed: Jun. 19, 2018

(65) Prior Publication Data

US 2019/0121977 A1 Apr. 25, 2019

Related U.S. Application Data

(60) Provisional application No. 62/574,248, filed on Oct. 19, 2017.

(51) Int. Cl.
*G06F 21/56* (2013.01)
*G06F 21/55* (2013.01)
*G06F 21/57* (2013.01)

(52) U.S. Cl.
CPC .......... *G06F 21/564* (2013.01); *G06F 21/552* (2013.01); *G06F 21/554* (2013.01); *G06F 21/566* (2013.01); *G06F 21/577* (2013.01)

(58) Field of Classification Search
None
See application file for complete search history.

(56) References Cited

U.S. PATENT DOCUMENTS

| 8,181,248 | B2* | 5/2012 | Oh .......................... G06F 21/56 709/224 |
| 8,555,385 | B1 | 10/2013 | Bhatkar et al. |
| 9,332,029 | B1 | 5/2016 | Tikhonov |
| 9,483,643 | B1 | 11/2016 | Yun |

(Continued)

FOREIGN PATENT DOCUMENTS

| EP | 3140732 A1 | 3/2017 |
| JP | 2014071796 A | 4/2014 |
| JP | 2016143320 A | 8/2016 |

OTHER PUBLICATIONS

Ye, Yanfang, et al. "Combining file content and file relations for cloud based malware detection." Proceedings of the 17th ACM SIGKDD international conference on Knowledge discovery and data mining. 2011. (Year: 2011).*

(Continued)

*Primary Examiner* — Madhuri R Herzog
(74) *Attorney, Agent, or Firm* — Arent Fox LLP; Michael Fainberg

(57) ABSTRACT

Disclosed herein are methods and systems of detecting malicious files. According to one aspect, a method comprises receiving one or more call logs from respectively one or more computers, each call log comprising function calls made from a file executing on a respective computer, combining the one or more call logs into a combined call log, searching the combined call log to find a match for one or more behavioral rules stored in a threat database, determining, when the behavioral rules are found in the call log, a verdict about the file being investigated and transmitting information regarding the verdict to the one or more computers.

24 Claims, 5 Drawing Sheets

(56) References Cited

U.S. PATENT DOCUMENTS

| | | | |
|---|---|---|---|
| 9,679,139 B1* | 6/2017 | Monastyrsky | G06F 21/566 |
| 2006/0161816 A1* | 7/2006 | Gula | H04L 41/065 |
| | | | 714/39 |
| 2011/0145920 A1 | 6/2011 | Mahaffey et al. | |
| 2012/0222120 A1* | 8/2012 | Rim | G06F 21/566 |
| | | | 726/24 |
| 2013/0160128 A1* | 6/2013 | Dolan-Gavitt | G06F 11/3414 |
| | | | 726/25 |
| 2013/0305368 A1* | 11/2013 | Ford | G06F 21/566 |
| | | | 726/23 |
| 2015/0378868 A1* | 12/2015 | Levit-Gurevich | |
| | | | G06F 11/3612 |
| | | | 714/38.1 |
| 2016/0357966 A1 | 12/2016 | Porat et al. | |

OTHER PUBLICATIONS

Peisert, Sean, et al. "Analysis of computer intrusions using sequences of function calls." IEEE Transactions on dependable and secure computing 4.2 (2007): 137-150. (Year: 2007).*

* cited by examiner

SYSTEM AND METHOD OF DETECTING A MALICIOUS FILE

CROSS REFERENCE TO RELATED APPLICATIONS

The present application claims priority to U.S. Provisional Application No. 62/574,248, filed Oct. 19, 2017, the entire contents of which are incorporated herein by reference.

FIELD OF TECHNOLOGY

The present disclosure generally relates to the field of computer security, and more particularly to systems and methods of detecting a malicious file.

BACKGROUND

Traditional signature analysis is not always able to detect malicious files and malicious code contained in the files, especially polymorphic viruses, obfuscated files, and shellcode. Therefore, modern antivirus applications make additional use of a verification employing a "sandbox", which is a special environment isolated from the rest of the system, limiting access and use of resources to the processes executed inside it. A sandbox may be realized, for example, in the form of a virtual machine, on the basis of a partial virtualization of the file system and register, on the basis of rules of access to the file system and the register, or on the basis of a hybrid approach. The file being verified is executed in the sandbox. In the course of the file execution, information about the application programming interface (API) function calls and system events is recorded in the call log. An antivirus application then analyzes the resulting call log.

The call log usually saves information about the calls for API functions produced by said file during its execution, and also information on the returns from the called API functions (transfer of control at the return address). The execution of a file in a sandbox usually takes place in the course of a limited time span (up to several dozens of seconds). At the same time, when a file containing shellcode is executed in a sandbox it may be difficult to detect the file execution by analysis of the logs of API function calls, because the shellcode may have been loaded into the memory of the process, but the execution of the process in the sandbox was terminated before control was to have been transferred to the memory location containing the shellcode.

Yet another technology for the detection of malicious code in a file is emulation, which consists in the imitation of the host system during the execution of code in an emulator.

The mentioned technologies are employed together in modern antivirus software. Usually a signature analysis of the file is performed at first, and then if no malicious behavior was detected, the file is executed in the emulator or sandbox. If no malicious behavior has been detected, the file is executed directly on the user's computer (not in an isolated environment, as in the case of a sandbox). At this stage, the work of yet another important antivirus module begins—the behavioral analyzer, which gathers and analyzes the log of API function calls in the course of the execution of the file on the user's computer. Making use of installed interceptor drivers, the behavioral analyzer intercepts the calls for API functions which occur during the execution of malicious code, and also the returns from the API functions called, and saves these in the call log. The behavioral analyzer then makes a search in the call log for patterns of known malicious behavior and issues a verdict (such as virus, worm, Trojan horse or conditionally unwanted software). The principle of analysis of the call log by a behavioral analyzer is similar to the work of a sandbox and emulator. But the behavioral analyzer does not have the drawbacks intrinsic to the aforesaid modules—there are no limits on the time of file execution, and the techniques of detection and bypassing of the emulator and sandbox do not work, since the file is executed on the user's computer, and not in an isolated environment or in an emulator.

But at the same time, the file behavior may be different depending on the execution environment or even when launched on the same computer with different input parameters. Thus, the behavior of a malicious file during each launching might not fall under a known pattern of malicious behavior. The technical problem is the poor quality of determination of malicious files whose behavior does not fall under known patterns of malicious behavior.

Other known methods of detection of malicious software in a real-world execution environment register the operations being performed by software in a log and searching for known patterns of malicious behavior in that log. However, this method is not able to solve the indicated technical problem of the poor quality of determination of malicious files whose behavior does not fall under known patterns of malicious behavior.

SUMMARY

Disclosed are systems and methods for of detecting a malicious file.

For example, a method for detecting a malicious file may comprise receiving one or more call logs from respectively one or more computers, each call log comprising function calls made from a file executing on a respective computer, combining the one or more call logs into a combined call log, searching the combined call log to find a match for one or more behavioral rules stored in a threat database, determining, when the one or more behavioral rules are found in the call log, a verdict about the file being investigated and transmitting information regarding the verdict to the one or more computers.

In another aspect, the method further comprises receiving one or more call logs that have already been searched for the one or more behavioral rules, and the one or more behavioral rules indicate that the file executing on the respective computer is one or more of: malicious software and conditionally unwanted software.

In another aspect, the method further comprises only combining the one or more call logs when the combined call log will have at least one record absent from the one or more call logs.

In another aspect, the combined call log comprises a control flow graph for the file under investigation.

In another aspect, the verdict is one or more of: virus, worm, Trojan horse and/or conditionally unwanted software.

In another aspect, the one or more behavioral rules include one or more of: calling of an API function from a suspicious function list, calling of a particular function a specified number of times, order of function calls, replacement of domain name server (DNS) information on the computer, disabling of operating system updates, and disablement of a network firewall.

In another aspect, the method further comprises creating a virus signature for the file and transmitting the virus signature to the one or more computers.

In another aspect, the method further comprises registering information related to the executing file in the one or more call logs.

In another aspect, the information comprises one or more of: indicators of compromise, security verdicts, a checksum of the executing file or a portion of the executing file, a source of an upload of the executing file to the respective computer, data transmitted and/or received by the executing file, and whether a DNS was replaced on the respective computer.

An example of a system for detecting a malicious file may comprise an information system comprising a plurality of computers, each of the plurality of computers comprising a computer protection module configured to register application programming interface (API) calls during execution of a file on a respective computer, searching a local call log for one or more behavioral rules from a local threat database, determining, when the one or more behavioral rules are found in the local call log, that the file is malicious, halting execution of the file on the respective computer, otherwise, transmitting the local call log to a detection module and the detection module, coupled to the information system, configured to: combine local call logs from the computer protection module of each of the plurality of computers to form a combined call log, search the combined call log for the one or more behavioral rules from second threat database, determine a verdict indicating that the file is malicious when the one or more behavioral rules are found in the combined call log and create a virus signature for the file and transmitting the virus signature to the computer protection module for each computer.

In another aspect, a computer readable medium is provided, storing thereon instructions that when executed by a processor, perform a method for detecting a malicious file comprising: receiving one or more call logs from respectively one or more computers, each call log comprising function calls made from a file executing on a respective computer, combining the one or more call logs into a combined call log, searching the combined call log to find a match for one or more behavioral rules stored in a threat database, determining, when a behavioral rule is found in the call log, a verdict about the file being investigated and transmitting information regarding the verdict to the one or more computers.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for systems and methods for cloud detection, investigation and elimination of targeted attacks. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used throughout the disclosure, drawings and claims.

Indicators of compromise (IOC) are artifacts or residual symptoms of an intrusion into an information system, observable on a computer or network. Sometimes, IOC are referred to as "indicates of infection". Typical indicators of compromise are virus signatures, IP addresses, check sums of files, URL addresses, domain names of command centers of botnets, and others. A number of standards exist for indicators of compromise, in particular:

OpenIOC (https://community.rsa.com/docs/DOC-62341, https://web.archive.org/web/20160401023434/http://blogs.rsa.com/understanding-indicators-of-compromise-ioc-part-i/, http://openioc.org/), STIX (https://stix.mitre.org/), CybOX (https://cybox.mitre.org) and others.

Computer attack (also cyber-attack) is a directed action on information systems and information-telecommunication networks by software and hardware, carried out for the purpose of disrupting the information security in these systems and networks.

Targeted attack—TA, is a particular case of a computer attack, directed at a specific organization or specific individual.

Advanced Persistent Threat—APT, are complex, lengthy, well-planned multi-avenue computer attacks making use of complex malicious software, methods of social engineering, and data on the information system of the victim.

Fuzzy hash (also flexible fingerprint or locality sensitive hash) is a file fingerprint which is resistant to changes in the file from which it is formed. That is, upon detecting a malicious file with the aid of its fingerprint value, many similar (possibly unknown) malicious files will also be detected. The chief characteristic of such a fingerprint is its invariance to minor changes in the file.

Fuzzy verdict is a response of a protection module (e.g., antivirus application) upon detecting suspicious actions during the execution of a file which are characteristic of a malicious file. A fuzzy verdict is triggered, for example, upon detecting a file with the aid of a flexible fingerprint. The fuzzy verdict testifies that the file found is malicious with a certain degree of probability.

Figure 1:
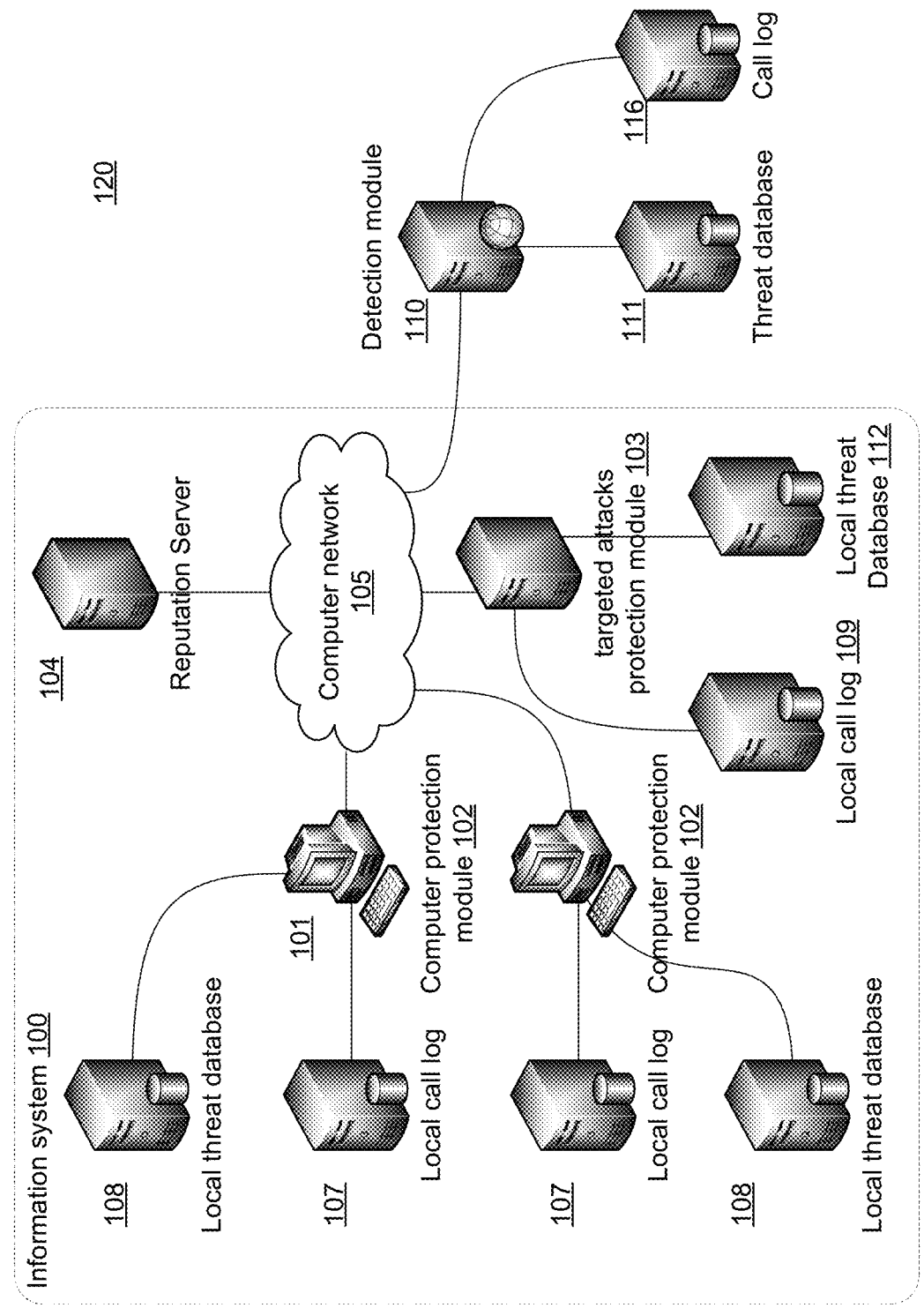
FIG. 1 is a block diagram of a system for detecting malicious files according to an exemplary aspect of the disclosure.

FIG. 1 presents a system 120 that detects a malicious file with the use of behavioral rules. The system 120 comprises the information system 100 along with a detection module 110, a threat database 111 and a call log 116.

The information system 100 (also the enterprise infrastructure) includes a group of computing devices 101 (also computers, in short) which are connected to each other by a computer network 105. By computing devices 101 is meant in general any computing devices and sensors, in particular personal computers, notebooks, smartphones, as well as communication devices such as routers, switches, hubs, etc. It should be noted that the computing device 101 may be either a physical device or a virtual machine. The information system 100 may be organized with the use of any network topology 105 known in the prior art, e.g. of a part of one of the following types: fully connected, bus, star, ring, cellular or hybrid type. A computer protection module (or simply protection module) 102 is installed on each of the computing devices 101 protection module. It should be noted that it is possible that a protection module 102 is not installed on certain computing devices 101. The information system 100 may include a targeted attacks protection module 103, which may be situated for example on a separate server and is connected to at least one computing device 101 by a computer network 105. Proxy servers (not indicated in the figure) may be used for connecting the computing devices 101 via the network 105 to the Internet and to the detection module 110.

In one particular aspect, the targeted attacks protection module 103 additionally may be configured to register information in the local call log 109 associated with the file that is being executed on said computing device 101 and passing through the computer network 105. In some aspects, this information may comprise:
- indicators of compromise;
- Security verdicts (for example, the verdict of a sandbox, IDS);
- a checksum from the file or a checksum from a portion of the file;
- the source of the file upload to the computing device 101 (for example, the source IP address, the flash drive from which the file was downloaded to the computer, etc.);
- data transmitted over the network by a file (for example, which IP addresses are accessed, which packets are transmitted, etc.);
- data received over the network by a file (for example, from which IP addresses are addressed, which packets are transmitted, etc.);
- Replacing the DNS server on the computer.

The targeted attacks protection module 103 may also be configured to transmit the local call log 109 to the detection module 110.

The system includes at least two computing devices 101 with computer protection module 102 running on the computing devices 101, respectively. The computer protection module 102 registers to the local call log 107 of each computing device 101, according to one aspect of the disclosure, the API function calls during the execution of the file being investigated (for example, the name of the function, the parameters being transmitted, the time of the function call).

In a particular aspect of the disclosure, each record of the local call log 107 contains at least the following information about the API function calls:
- the name of the function called;
- the unique process identifier (PID) of the process started from the mentioned file;
- the unique thread identifier (TID) of the thread executing the instructions of the address space of the process;
- the set of arguments of said function;
- the time of the function call.

During execution of the file in question, the computer protection module 102 performs a search in the local call log 107 for behavioral rules from a local threat database 108. In a particular aspect of the disclosure, the local call log 107 and the local threat database 108 are situated on the computing device 101.

The behavioral rules include information about the call of at least one API function. In a particular aspect of the disclosure, the behavioral rules comprise a particular set of API function calls and Boolean expressions for those API function calls. For example, if certain API functions have been called with certain parameters by the file in question, as specified by a behavioral rule, the protection module 102 will find that rule in the call log 107.

The behavioral rules also correspond to a verdict which is issued upon the triggering of the particular rule. In one aspect of the disclosure, the verdict represents the most probable category of a malicious or unwanted software corresponding to the triggered rule. The verdict may include one or more of, for example: virus, worm, Trojan horse, and/or conditionally unwanted software.

In a particular sample aspect, the behavioral rules include at least the following:
- the calling of an API function from a list of suspicious API functions (for example, the list may contain the following API functions: WinExec, CreateProcess, GetFileSize, Create File);
- the calling of the API function GetFileSize has been performed 10 times;
- after the calling of the API function WriteFile, there ensues the calling of the API function WinExec (launching of the file for execution);
- replacement of the DNS server on the computer;
- disconnection of automatic operating system updating;
- disconnection of the network firewall;
- disconnection of the protection module;
- disconnection of the UAC (User Account Control—a component of the Windows OS);

If the protection module 102 has not found in the local call log 107 a single behavioral rule from the local threat database 108, the protection module 102 will transmit the local call log 107 to the detection module 110 situated on the remote server.

In a particular sample aspect, the protection module 102 may transmit the local call log 107 to the detection module 110 only if a behavioral rule has been found which corresponds to a verdict of malicious software. In another sample aspect, the local call log 107 will also be transmitted if a behavioral rule has been found corresponding to the verdict of conditionally unwanted software.

The detection module 110 combines, for the file being analyzed, the local call logs 107 obtained from at least two protection modules 102 into a combined call log 116 situated on the remote server.

It should be noted that the combination of the local call logs 107 is carried out in the event that for each local call log 107 the combined call log 116 will have at least one record which is absent from mentioned local call log 107.

We shall present an example—say there are three local call logs. The first log contains the records A, B, C, the second A, B, D, and the third A, C, D. In this example, a combined call log will be created containing the records A, B, C, D. The combined call log will have records which are absent from each of the local logs. The record D is absent from the first log, the record C is absent from the second log, and the record B from the third log.

We shall present yet another example—say there are three local call logs. The first log contains the records A, B, the second A, B, C, and the third A, C. In this example, the combined call log will not be created, since it would contain the records A, B, C, and would correspond to the second local log (i.e., the combined log would not have records which are absent from the second log).

In one particular sample aspect, the combined call log 116 will contain all the records of each local call log 107. In another particular sample aspect, the combined call log 116 will contain all the records of one local call log 107 (such as the first) and the records of the other local call logs 107 which are absent from the first call log.

In a particular sample aspect, the combining of the local call logs 107 into the combined call log 116 is done by combining the records of the local call logs 107. In this case, intersecting records may or may not be duplicated in the combined call log 116. In yet another sample aspect, the local call logs 107 may additionally contain a control flow graph (CFG) of the process launched from the file, and in this example the combined call log 116 will contain a combined control flow graph for the mentioned file, obtained by the combining of several control flow graphs.

The detection module 110 performs a search for behavioral rules from the threat database 111 in the combined call log 116. The mentioned threat database is situated on a remote server and contains, in particular, all the records of the local threat database 108 of each computing device 101.

Figure 2:
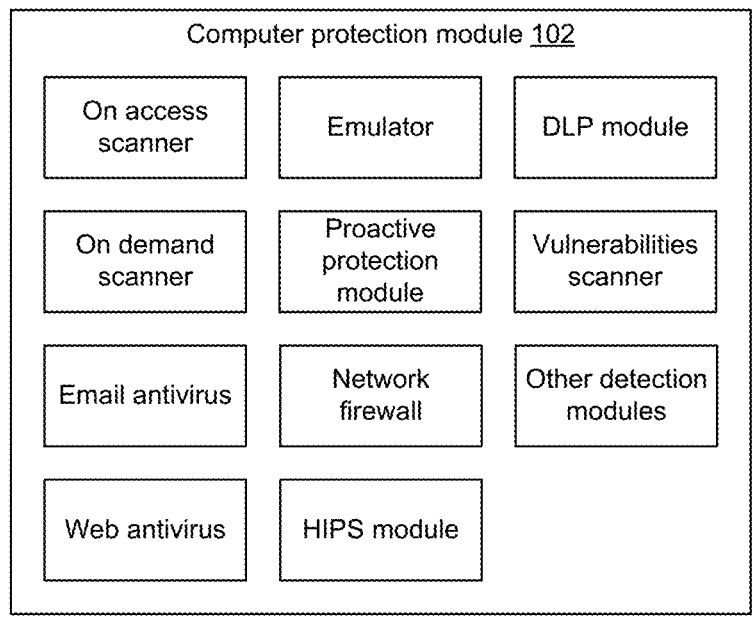
FIG. 2 is a block diagram of a computer protection module according to an exemplary aspect of the disclosure.

FIG. 2 shows a possible example of the modules of a computer protection module. The computer protection module 102 may contain modules designed to ensure the security of the computing device 101: an on-access scanner, an on demand scanner, an email antivirus, a web antivirus, a proactive protection module, a HIPS (Host Intrusion Prevention System) module, a DLP (data loss prevention) module, a vulnerabilities scanner, an emulator, a network firewall, etc. In a particular sample aspect, the indicated modules may be a component of the protection module 102. In yet another sample aspect, these modules may be implemented as separate software components.

The on access scanner contains a functionality of detecting malicious activity of all files being opened, launched, and saved on the user's computer system. The on demand scanner differs from the access scanner in that it scans files and directories specified by the user on the user's demand.

The email antivirus is needed to check incoming and outgoing emails for malicious files. The web antivirus serves to prevent the execution of malicious code which might be contained on websites posted by the user, and also to block the opening of websites. The HIPS module serves to detect unwanted and malicious activity of programs and to block this at the moment of execution. The DLP module serves to detect and prevent loss of confidential data from the computer or network. The vulnerabilities scanner is needed to detect vulnerabilities on the computing device 101 (for example, certain components of the protection module 102 having been disconnected, obsolete virus databases, a network port having been closed, etc.). The network firewall provides control and filtration of network traffic in accordance with specified rules. The work of the emulator consists in imitating the host system during the execution of code in the emulator. The proactive protection module uses behavioral signatures to detect the behavior of files being executed and to classify the files by level of trust.

The indicated modules upon detecting malicious software (suspicious behavior, spam, and other signs of a computer threat) create a corresponding notification (which may then be transformed into a verdict of the protection module 102), telling the protection module about the threat detected and the need to take action to eliminate the threat (such as removal or alteration of the file, a ban on its execution, etc.). In a particular sample aspect, the module itself which has detected the malicious software may perform the actions to remove the threat. In yet another example, the verdict may be a fuzzy or test verdict (since the verdict might generate false alarms)—in this case, the protection module will not perform actions to eliminate the threat, but instead pass on the notification to the detection module 110. It should be noted that the verdict of the protection module 102 is part of the information about the file which will then be transmitted to the detection module 110 in the form of a security notification. In a particular aspect of the disclosure, the malicious software includes the following categories (the verdict corresponding to a category): malicious software and conditionally unwanted software. Malicious software may have subcategories: viruses, worms, Trojan horses, packers, malicious utilities. The conditionally unwanted software is adware, pornware, legal software whose use may cause harm to the computer (riskware), and others.

Figure 3:
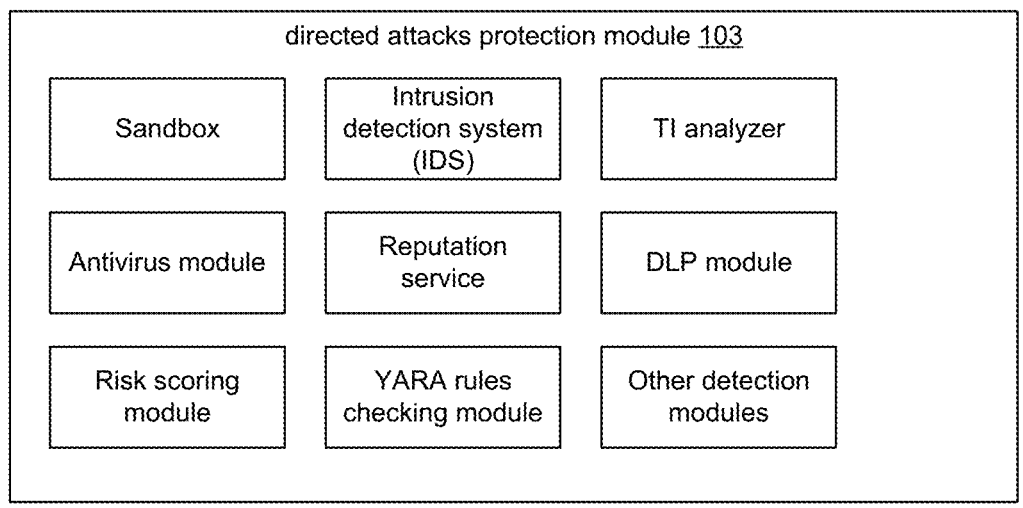
FIG. 3 is a block diagram of a targeted attacks protection module according to an exemplary aspect of the disclosure.

FIG. 3 presents a possible example of the modules of a targeted attacks protection module. The targeted attacks protection module 103 may contain, for example, the following protection modules: a sandbox, an Intrusion Detection System (IDS), a reputation service, a YARA rules checking module, and other detection modules.

The sandbox module has a functionality analogous to the emulator of the computer protection module 102 with the difference that the sandbox can utilize additional computing capabilities and work longer, since the targeted attacks protection module 103 has no time limits such as are intrinsic to the computer protection module 102.

The sandbox is a computer environment for safe execution of processes and it serves to determine suspicious activity during the execution of a process launched from a file.

The sandbox may be realized, for example, in the form of a virtual machine, on the basis of a partial virtualization of the file system and register, on the basis of rules of access to the file system and the register, or on the basis of a hybrid approach.

According to one aspect of the disclosure, the intrusion detection system may identify occurrences of unauthorized access to a computing device 101 or network 105 or unsanctioned control of the computing device 101 or network 105.

The reputation service may be a mirror or a cached copy of the reputation server 104 and, moreover, it contains information on the popularity of the files on the computing devices 101 (the number of computing devices 101 on which a file is present, the number of launches of a file, and so on).

The YARA rules checking module serves to check YARA signatures—an open signature format (see http://yararules.com/).

The DLP module serves to detect and prevent loss of confidential data from a computer or network.

Figure 4:
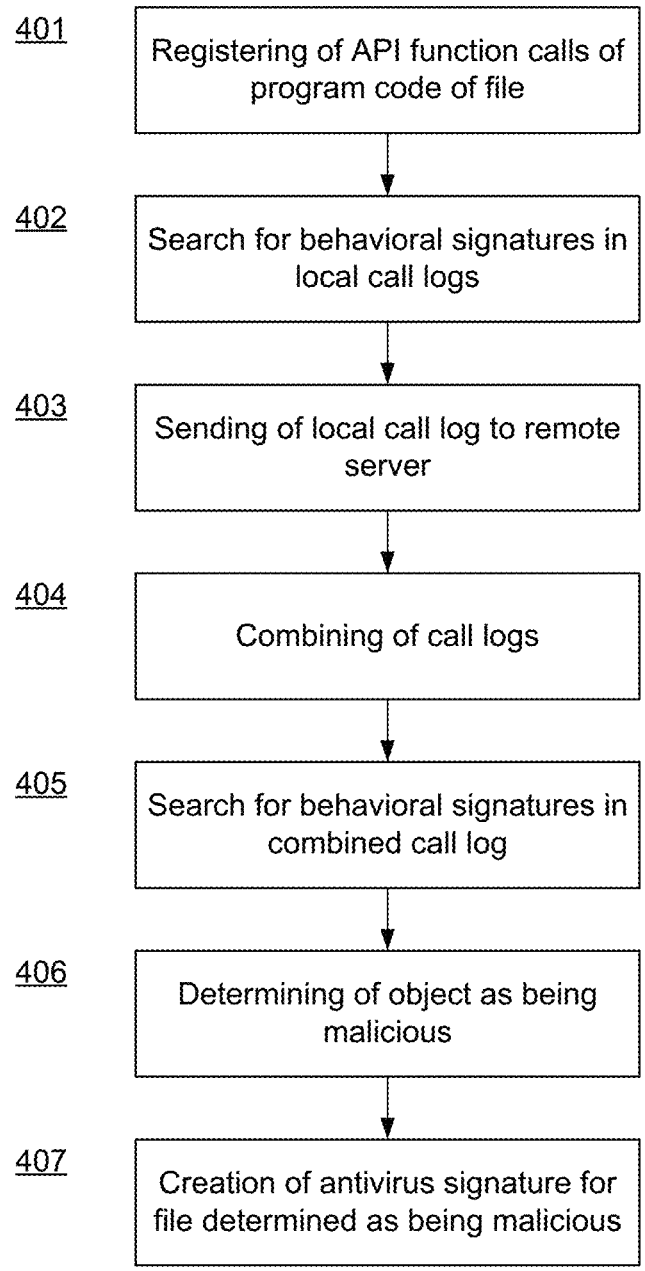
FIG. 4 is a flowchart for a method of detecting a malicious file according to an exemplary aspect of the disclosure.

FIG. 4 is a flowchart for the method 400 of determining a malicious file. The method 400 is an exemplary implementation of the components of the system 101 described in FIG. 1 as executed by the computer system 20.

The method begins at step 401 where the protection module 102 of at least two computing devices 101 register to the local call log 107 of each computing device 101, in particular, the API function calls during the execution of the program code of a file. The process launched from the file is executed on each of said computing devices 101.

The computing devices 101 may have a different environment (the OS and its versions, the OS updates installed, the installed software and drivers, the services and processes being implemented, the presence of a connection to the Internet, peripheral devices, etc.). Moreover, the file may be opened for execution with different parameters, depending on the computing device 101 or the time of opening or other factors. Such parameters may be, for example, the rights of the user (with administrator rights or user rights), the purpose of the launching (for example, a particular object or another file is transferred to the input of the file being executed), with different launch keys (for example, the command "ie.exe-k" of the interpreter of the command line Windows "Cmd.exe" launches the Internet Explorer browser in full-screen mode) and others. Thus, during the execution of the same file on different computing devices 101 (or even on the same device) that file may have different behavior, carry out calls for different API functions, and so forth. For example, if one computing device 101 lacks a connection to the Internet, the file will not be able to access IP addresses which it could access if executed on another computing device 101 having a connection to the Internet.

In step 402, on each of the mentioned computing devices 101 the protection module 102 (installed on the corresponding computing device 101) is used in the process of executing the program code of the file to search in the local call log 107 for behavioral rules from the local threat database 108. If the protection module 102 has found a behavioral rule, the file will be determined as being malicious directly on the computing device 101 and further execution of the file will be completed by the protection module 102. Otherwise, in step 403, the protection module 102 will send the local call log 107 to the detection module 110.

In step 404, the detection module 110 is used to combine the local call logs 107 received for the mentioned file into a combined call log 116. It should be noted that step 404 will be applicable when the detection module 110 obtains local call logs 107 from at least two different protection module 102 pertaining to the mentioned file there is at least one record in the combined call log 116 which is absent from each of the local call logs 107.

In step 405 the detection module 110 performs a search for behavioral rules from the threat database 111 in the combined call log 116. In a particular aspect of the disclosure, the local threat database 108 and the threat database 111 are copies. In another particular aspect of the disclosure, the threat database 111 contains at least all the records of the local threat database 108 and possibly other records.

For example, in order to save space on computing devices 101, local threat databases 108 may contain entries about the most common threats that are characteristic of a given region, at a given time, or for the owner of the information system 100. In yet another example, the local threat databases 108 are a mirror copy of the threat database 111 and are updated periodically. In this case, it is obvious that since the last update of the local threat database 108 and until the next scheduled update, the threat database 111 could be updated with new threat records that are not present in the local threat databases 108.

As a result, in step 406, if at least one behavioral rule has been found from the threat database in the combined call log 116, the file will be determined as being malicious according to the found behavioral rule. In this case, in step 407 the detection module 110 may give a verdict regarding the determined file (such as virus, worm, Trojan horse or conditionally unwanted software) and may create a virus signature for the protection module 102. By virus signature is meant, for example, the signature for the signature analysis module of the protection module 102 or the signature of an emulator.

Thus, the proposed technical problem will be solved—by using the specified method, a malicious file will be determined that was not determined by the protection module 102. And the technical result will be attained—better quality of determining a malicious file with the use of behavior rules by performing a search for behavioral rules from the threat database in the combined call log, produced by combining the various local call logs from at least two computers for a single file.

Several examples of different behavior during the execution of a file on different computing devices 101 are discussed below depending on their environment.

For example, if a file contains code for detecting and bypassing an emulator, then on a computing device 101 with an emulator operating, the file may perform safe actions, while on another computing device 101 where no emulator is operating, the file will perform malicious actions.

In yet another example, a file may check the location of the computing device 101 (for example, a from the localization of the OS) and perform different actions depending on the location. In another example, during the execution of a file malicious actions may be performed with respect to specific applications and corresponding verdicts may be produced, and if these applications are not installed on a computing device 101 the malicious actions will not be performed and the verdicts will not be produced.

In yet another example, a file may download over the network additional malicious modules depending on the OS architecture (32 or 64 bit). In yet another example, a file may use different channels of access to the command center—for example, via HTTPs, DNS, Twitter, Yandex.Disk or other access channels. In this case, the file may gain access on one computing device 101 via HTTPs, and on another via Twitter because access was not obtained via HTTPs.

In yet another example, a file launched on a computing device 101 with administrator rights may begin to perform malicious activity at once. But when this same file is launched on a computing device 101 without administrator rights, the file may attempt to augment its rights.

In a particular aspect of the disclosure, the computer protection module 102 and the targeted attacks protection module 103 is used to additionally register at least some of the following information:

procedures for transfer of control to the return address from API functions;
direct calls of Windows NT Native API functions;
returns from Windows NT Native API functions;
events of disconnection or overloading of the computer system;
system events of the operating system;
indicators of compromise;
system calls (such as fopen( ) create( );
verdicts of the protection module (such as virus, worm, Trojan horse or conditionally unwanted software);
the check sum of a file or a portion thereof;
the source of the download of the file onto the computing device 101 (for example, the IP address of the source, the flash drive from which the file was loaded onto the computer, etc.);
the results of an emulation of the execution of the file (the verdict of the emulator);

the time of appearance of the file on the computing device;

the data being transmitted through the network by the file (for example, which IP addresses are accessed, which packets are transmitted, etc.);

the data being obtained through the network by the file (for example, which IP addresses are accessed, which packets are transmitted, etc.).

In another particular sample aspect, the computer protection module 102 and the targeted attacks protection module 103 is used to additionally register at least some of the following information:

substitution of the DNS server on the computer;
disabling of automatic operating system updates;
disabling of the network firewall;
disabling of the protection module;
disabling of the user account control component;
disabling of the system restore component of the operating system.

In yet another particular sample aspect, the computer protection module 102 and the targeted attacks protection module 103 is used to additionally register at least some portions of the following information:

disconnection of the option "display hidden files, folders and disks" in the file manager;
changing of the rules of the network firewall;
changing of the hosts file;
deletion of the file by itself (for example, a process is executed from the malicious file which then embeds malicious code in the context of the system process svchost.exe, after which it deletes the original malicious file);
events of disconnection or overloading of the computer system;
exceptional situations occurring in the process;
obtaining of addresses of descriptors of system libraries (such as kernel32.dll, ntdll.dll);
memory allocation;
reading of system structures (process environment block—PEB);
consecutive obtaining of file descriptors.

In yet another particular aspect of the disclosure, the above-indicated information connected with child processes and new files which were created in the process of executing the file being analyzed is additionally registered.

In one particular aspect, the targeted attacks protection module 103 is configured to registered, with the local call log 109, information associated with a file executed on said computing device 101 and passing through a computer network. In this aspect, the targeted attacks protection module may be located on a separate remote server and connected via a computer network 105 with at least one computing device 101. In some aspects, this information may include one or more of:

indicators of compromise;
Security verdicts (for example, the verdict of a sandbox, IDS);
a checksum from the executing file or a checksum from a portion of the file;
the source of the file upload to the computing device 101 (for example, the source IP address, the flash drive from which the file was downloaded to the computer, etc.);
data transmitted over the network by a file (for example, which IP addresses are accessed, which packets are transmitted, etc.);
data received over the network by a file (for example, from which IP addresses are addressed, which packets are transmitted, etc.);
substitution of the DNS server on the computer The targeted attacks protection module 103 in this aspect further transmits a local call log 109 to the detection module 110 that adds local call log records 109 to the combined call log 116 in step 404. In a particular aspect, targeted attacks protection module 103 can also be associated with a local threat database 112. In this case, the targeted attacks protection module 103 can search the local call log 109 for compliance with behavioral rules from the local threat database 112. In the event that a match is found with at least one behavioral rule, the file can be determined as malicious and an appropriate verdict will be issued. A notification will be sent to a protection module 102 located on the computing device 101 on which the file is executed. After that, a protection module 102 will perform actions to fix the file identified by the malware. If the targeted attacks protection module 103 does not detect compliance with any of the behavioral rules, the local call log 109 will be transmitted to the detection module 110 in step 403. In a particular aspect, the local call log 109 and the local threat database 112 are located on the same remote server as the targeted attacks protection module 103.

Figure 5:
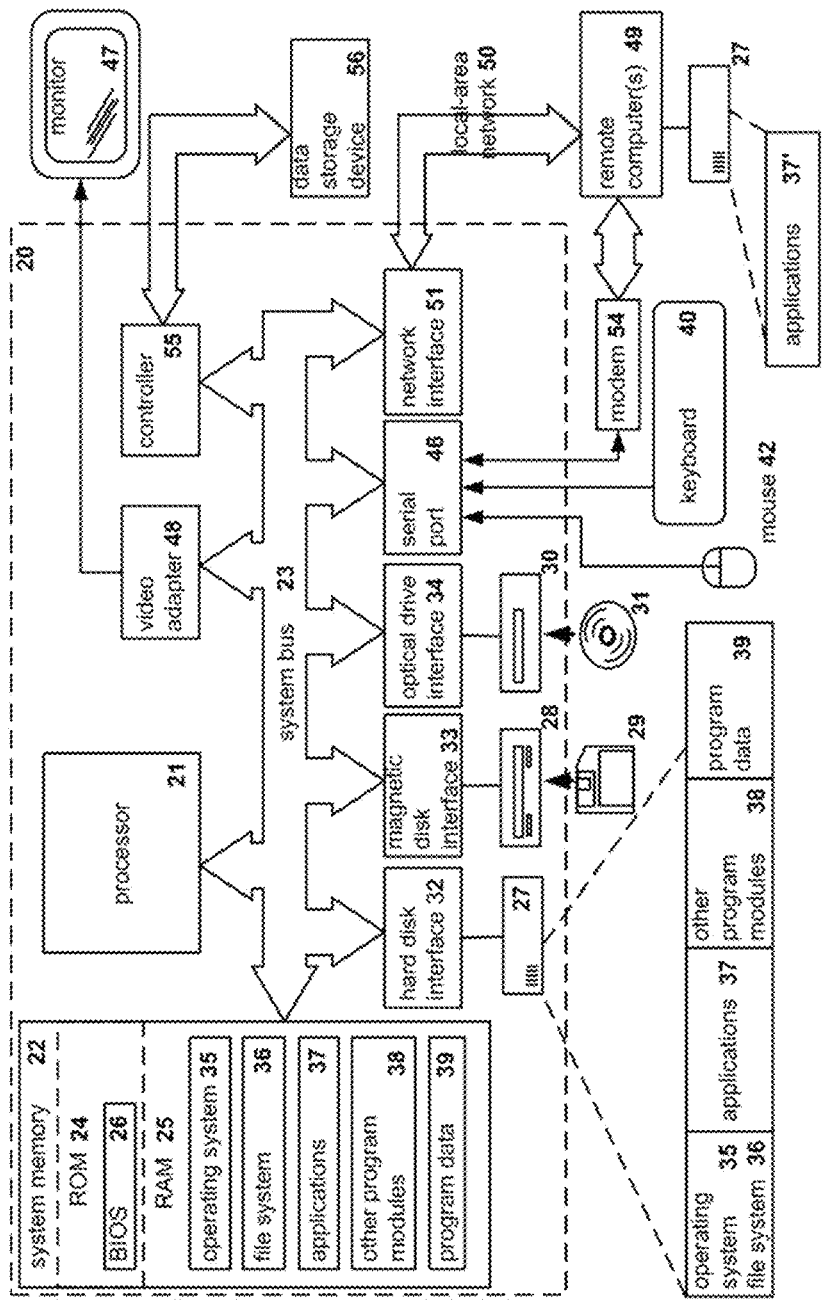
FIG. 5 is a block diagram of a general-purpose computer system according to an exemplary aspect of the disclosure.

FIG. 5 is a diagram illustrating a general-purpose computer system on which aspects of systems and methods of detecting a malicious file may be implemented in accordance with an exemplary aspect of the disclosure.

As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

The computer system 20 includes a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, supra). Accordingly, each module may be realized in a variety of suitable configurations, and should not be limited to any particular implementation exemplified herein.

In the interest of clarity, not all of the routine features of the aspects are disclosed. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting a malicious file comprising:
receiving, at a remote server, a plurality of call logs from a plurality of user computers, each call log comprising function calls made by a same file executing on each of the respective user computers, and control flow graphs of processes launched from the same file;
combining the plurality of call logs into a combined call log stored on the remote server,
wherein the combining is performed only when, for each of the plurality of call logs received from the plurality of user computers, the combined call log includes at least one record which is absent from each of the plurality of call logs, and
wherein the combined call log further includes a combined control flow graph that is obtained by combining all of the control flow graphs received for the file;
searching the combined call log stored on the remote server to find a rule that matches one or more behavioral rules stored in a threat database associated with the server;
when a rule matching the one or more behavioral rules is found in the combined call log stored on the remote server, determining a verdict about the file being executed, wherein the verdict indicates whether or not the file is malicious; and
transmitting information regarding the verdict to the plurality of user computers.

2. The method of claim 1, further comprising:
receiving, from the plurality of user computers, the plurality of call logs that have already been searched for the one or more behavioral rules, wherein the one or more behavioral rules indicate that the file being executed is one or more of: malicious software and conditionally unwanted software.

3. The method of claim 1, further comprising:
when the combining of the plurality of call logs is not performed, searching for the match of rules in a call log of one of the plurality of user computers that contains a union of all of the records of the call logs of the plurality of user computers.

4. The method of claim 1, wherein the malicious file is a file that downloads additional malicious software modules over a network.

5. The method of claim 1, wherein the verdict indicates that the file is malicious when the file includes one or more of: virus, worm, horse and/or conditionally unwanted software.

6. The method of claim 1, wherein the one or more behavioral rules include one or more of: calling of an API function from a suspicious function list, calling of a particular function a specified number of times, order of function calls, replacement of domain name server (DNS) information on the computer, disabling of operating system updates, and disablement of a network firewall.

7. The method of claim 1, further comprising:
creating a virus signature for the file and transmitting the virus signature to the one or more computers.

8. The method of claim 1, further comprising:
registering information related to the file being executed in the plurality of call logs.

9. The method of claim 8, wherein the information comprises one or more of: indicators of compromise, security verdicts, a checksum of the executing file or a portion of the executing file, a source of an upload of the executing file to the respective computer, data transmitted and/or received by the executing file, and whether a DNS was replaced on the respective computer.

10. A system for detecting malicious files comprising:
an information system comprising a plurality of computers, each of the plurality of user computers comprising a computer protection module configured to:
register application programming interface (API) calls made by a file during an execution of the file on a user computer in a local call log, the local call log also comprising control flow graphs of processes launched from the file;
search the local call log for a rule that matches one or more behavioral rules stored in a local threat database;
when the one or more behavioral rules are found in the local call log, determine that the file is malicious and halt the execution of the file on the user computer;
when the one or more behavioral rules are not found in the local call log, transmit the local call log to a detection module on a remote server; and
the detection module on the remote server, coupled to the information system, configured to:
combine local call logs received from the computer protection module of each of the plurality of user computers to form a combined call log stored on the remote server, wherein the combining is performed only when, for each of the plurality of call logs received from the plurality of user computers, the combined call log includes at least one record which is absent from each of the plurality of call lops, and wherein the combined call log includes a combined control flow graph that is obtained by combining all of the control flow graphs received for the file;
search the combined call log stored on the remote server for a rule that matches the one or more behavioral rules stored on a second threat database associated with the server;
when a rule matching the one or more behavioral rules is found in the combined call log stored on the remote server, determine a verdict indicating that the file is malicious;
create a virus signature for the file, and transmit the virus signature to the computer protection module of the plurality of user computers.

11. The system of claim 10, wherein the detection module is further configured to:
receive, from the plurality of user computers, the plurality of call logs that have already been searched for the one or more behavioral rules, wherein the one or more behavioral rules indicate that the file being executed is one or more of: malicious software and conditionally unwanted software.

12. The system of claim 10, wherein the when the combining of the plurality of call logs is not performed, searching for the match of rules in a call log of one of the plurality of user computers that contains a union of all of the records of the call logs of the plurality of user computers.

13. The system of claim 10, wherein the malicious file is a file that downloads additional malicious software modules over a network.

14. The system of claim 10, wherein the verdict indicates that the file is malicious when the file includes one or more of: virus, worm, Trojan horse and/or conditionally unwanted software.

15. The system of claim 10, wherein the one or more behavioral rules include one or more of: calling of an API function from a suspicious function list, calling of a particular function a specified number of times, order of function calls, replacement of domain name server (DNS) information on the computer, disablement of operating system updates, and disconnection of a network firewall.

16. The system of claim 10, further comprising:
a targeted attacks protection module configured to register information related to the executing file in the plurality of call logs.

17. The system of claim 16, wherein the information comprises one or more of: indicators of compromise, security verdicts, a checksum of the executing file or a portion of the executing file, a source of an upload of the executing file to the respective computer, data transmitted and/or received by the executing file, and whether a DNS was replaced on the respective computer.

18. A non-transitory computer-readable medium storing thereon instructions that when executed by a processor, perform a method for detecting a malicious file comprising:
receiving, at a remote server, a plurality of call logs from a plurality of user computers, each call log comprising function calls made by a same file executing on each of the respective user computers, and control flow graphs of processes launched from the same file;
combining the one or more plurality of call logs into a combined call log stored on the remote server,
wherein the combining is performed only when, for each of the plurality of call logs received from the plurality of user computers, the combined call log includes at least one record which is absent from each of the plurality of call logs, and wherein the combined call log further includes a combined control flow graph that is obtained by combining all of the control flow graphs received for the file;

searching the combined call log stored on the remote server to find a rule that matches one or more behavioral rules stored in a threat database associated with the server;

when a rule matching the one or more behavioral rules is found in the combined call log stored on the remote server, determining a verdict about the file being executed, wherein the verdict indicates whether or not the file is malicious; and transmitting information regarding the verdict to the plurality of user computers.

19. The non-transitory computer-readable medium of claim 18, further comprising:

receiving, from the plurality of user computers, the plurality of call logs that have already been searched for the one or more behavioral rules, wherein the one or more behavioral rules indicate that the file being executed is one or more of: malicious software and conditionally unwanted software.

20. The non-transitory computer-readable medium of claim 18, further comprising:

when the combining of the plurality of call logs is not performed, searching for the match of rules in a call log of one of the plurality of user computers that contains a union of all of the records of the call logs of the plurality of user computers.

21. The non-transitory computer-readable medium of claim 18, wherein the malicious file is a file that downloads additional malicious software modules over a network.

22. The non-transitory computer-readable medium of claim 18, wherein the verdict indicates that the file is malicious when the file includes one or more of: virus, worm, Trojan horse and/or conditionally unwanted software.

23. The non-transitory computer-readable medium of claim 18, wherein the one or more behavioral rules include one or more of: calling of an API function from a suspicious function list, calling of a particular function a specified number of times, order of function calls, replacement of domain name server (DNS) information on the computer, disablement of operating system updates, and disconnection of a network firewall.

24. The non-transitory computer-readable medium of claim 18, further comprising:

creating a virus signature for the file and transmitting the virus signature to the one or more computers.

* * * * *